US006965180B2

(12) United States Patent
Oh et al.

(10) Patent No.: US 6,965,180 B2
(45) Date of Patent: Nov. 15, 2005

(54) ELECTRIC MOTOR WITH SELF-ADJUSTING BUSHING STRUCTURE

(75) Inventors: JonYeon Oh, Suwanee, GA (US); Roland Ree, Alpharetta, GA (US); Barry Anderson, Suwanee, GA (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 35 days.

(21) Appl. No.: 10/801,306

(22) Filed: Mar. 16, 2004

(65) Prior Publication Data

US 2005/0104463 A1 May 19, 2005

Related U.S. Application Data

(60) Provisional application No. 60/520,015, filed on Nov. 14, 2003.

(51) Int. Cl.[7] .......................... H02K 37/00; F16H 1/16

(52) U.S. Cl. .......................... 310/90; 310/89; 384/243; 384/244; 384/245

(58) Field of Search .......................... 310/91, 89, 75 R, 310/83, 51, 40 MM; 384/243–245, 223; 74/425, 409

(56) References Cited

U.S. PATENT DOCUMENTS

| | | | | |
|---|---|---|---|---|
| 4,900,960 A * | 2/1990 | Becker et al. | ................ | 310/85 |
| 5,144,738 A * | 9/1992 | Oyafuso | ...................... | 29/596 |
| 5,213,000 A | 5/1993 | Saya et al. | ..................... | 74/425 |
| 5,747,911 A * | 5/1998 | Kikly | ......................... | 310/239 |
| 5,811,903 A * | 9/1998 | Ueno et al. | ................... | 310/90 |
| 6,541,886 B2 * | 4/2003 | Mayumi | ..................... | 310/91 |
| 6,886,678 B2 * | 5/2005 | Acosta | .................... | 192/223.3 |
| 2005/0081667 A1 * | 4/2005 | Oh et al. | ...................... | 74/425 |

FOREIGN PATENT DOCUMENTS

| | | | | |
|---|---|---|---|---|
| DE | 4128110 A1 | 2/1993 | .......... | H02K 5/167 |
| DE | 19513970 A1 | 10/1996 | .......... | H02K 7/116 |
| DE | 19537503 A1 | 3/1997 | ........... | F16C 33/08 |
| EP | 0998013 A1 | 5/2000 | ............ | H02K 7/08 |
| EP | 1122863 A2 | 8/2001 | ............ | H02K 7/08 |
| GB | 2016213 A | 9/1979 | .......... | H02K 7/116 |
| JP | 10066296 | 3/1998 | .......... | H02K 5/167 |

OTHER PUBLICATIONS

PCT International Search Report mailed Jan. 13, 2005 (4 pages).
PCT Written Opinion of the International Searching Authority (5 pages).

* cited by examiner

*Primary Examiner*—Tran Nguyen
*Assistant Examiner*—Leda T. Pham

(57) ABSTRACT

A bushing structure 10 is constructed and arranged to be operatively associated with a shaft 24 of an electric motor 22. The motor has a housing 30 including a generally elliptical recess 32 therein defined along an axis C of the shaft. The bushing structure includes a generally cylindrical bushing member 12 constructed and arranged to engage an end of the shaft so as to locate the shaft with respect to the housing and to prevent lockup of the motor. An endplay member 20 is associated with the bushing member and with the end of the shaft. The endplay member includes a spherical portion constructed and arranged to be received in the elliptical recess so as to control endplay of the shaft.

15 Claims, 3 Drawing Sheets

ELECTRIC MOTOR WITH SELF-ADJUSTING BUSHING STRUCTURE

This application is based on U.S. Provisional Application No. 60/520,015, filed on Nov. 14, 2003 and claims the benefit thereof for priority purposes.

FIELD OF THE INVENTION

This invention relates to controlling endplay and alignment of a shaft of an electric motor.

BACKGROUND OF THE INVENTION

In conventional motors, one of a number of endplates is selected to take-up a gap between an end of a shaft and a gear housing. The endplay plates vary in thickness by 0.1 mm. Visual inspection is done to optimize the gap and the correct thickness endplay plate is picked up via automation to meet the constant endplay plate gap of between 0.02–0.20 mm. Disadvantages of this configuration include the requirement of providing numerous parts (endplay plates) with different thickness. In addition, a constant process check is needed to select the optimum endplay plate 10 based on the gap between the end of the shaft 12 and endplay plate 10. Furthermore, with these configurations, a separate cylindrical bushing is needed to locate the shaft. Thus, conventional motors require numerous parts with regard to controlling shaft location and endplay.

Thus, there is a need to reduce the number of parts for controlling shaft location and endplay.

SUMMARY OF THE INVENTION

An object of the present invention is to fulfill the need referred to above. In accordance with the principles of the present invention, this objective is obtained by providing a bushing structure constructed and arranged to be operatively associated with a shaft of an electric motor. The motor has a housing including a generally elliptical recess therein defined along an axis of the shaft. The bushing structure includes a generally cylindrical bushing member constructed and arranged to engage an end of the shaft so as to locate the shaft with respect to the housing and to prevent lockup of the motor. An endplay member is associated with the bushing member and with the end of the shaft. The endplay member includes a spherical portion constructed and arranged to be received in the elliptical recess so as to control endplay of the shaft.

In accordance with another aspect of the invention, an electric motor includes a housing and a shaft mounted for rotation with respect to the housing. The housing includes a generally elliptical recess therein. The recess is disposed generally adjacent to an end of the shaft. A generally cylindrical bushing member is engaged with an end of the shaft so as to locate the shaft with respect to the housing and to prevent lockup of the motor. An endplay member is associated with the end of the shaft and includes a spherical portion received in the elliptical recess so as to control endplay of the shaft.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENT

Figure 1:
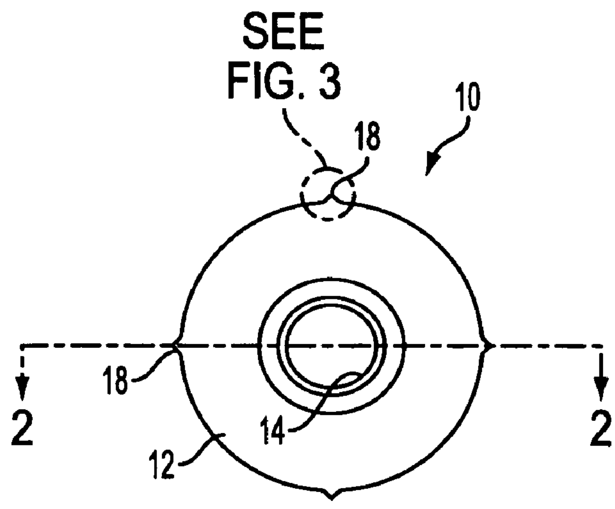
FIG. 1 shows a top view of a self-adjusting cylindrical bushing structure provided in accordance with the principles of the invention.
Figure 2:
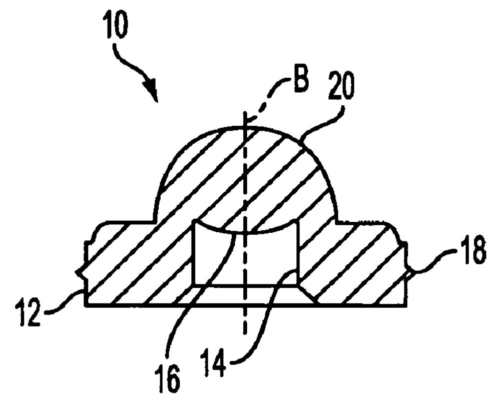
FIG. 2 is a cross sectional view taken along the line 2—2 of FIG. 1.
Figure 3:
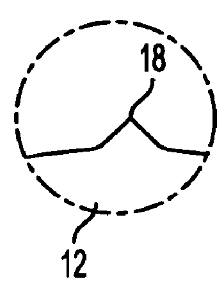
FIG. 3 is an enlarged view of the portion encircled in FIG. 1.
Figure 4:
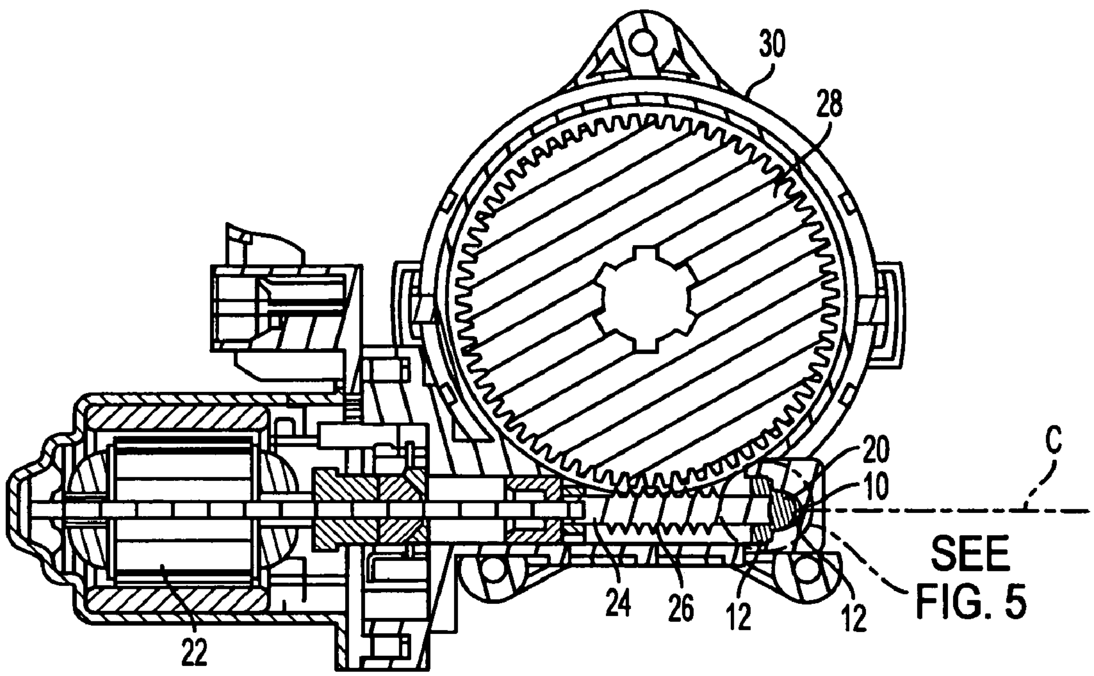
FIG. 4 is a sectional view of an electric motor incorporating the self-adjusting cylindrical bushing structure of FIG. 1.

With reference to FIGS. 1–3, a self-adjusting cylindrical bushing structure is shown, generally indicated at 10, in accordance with the invention. The bushing structure 10 includes a generally cylindrical bushing member 12 having a central axis B. The bushing member 12 includes a recess 14 therein extending along the axis B and constructed and arranged to receive an end of a rotatable shaft 24 of a motor 22 (FIG. 4). The motor 22 is preferably a bidirectional windowlift motor for a vehicle. A bottom of the recess includes a curved portion 16 that engages the shaft end. The bushing member 14 also includes a plurality of protrusions 18 extending outwardly from a periphery thereof, the function of which will be explained below. An endplay member 20 in the form of a generally half-sphere, is integral with and extends from the bushing member 12.

Figure 5:
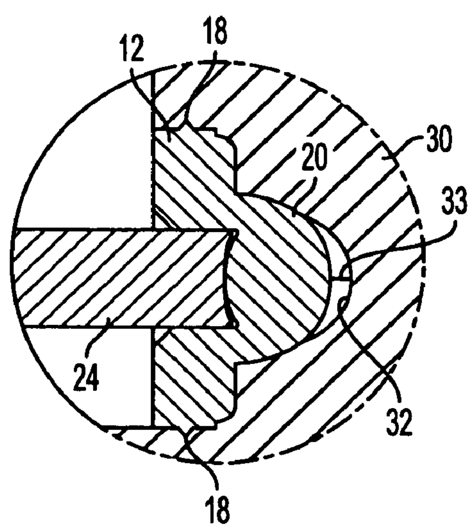
FIG. 5 is an enlarged view of the portion encircled in FIG. 4.

The bushing structure 10 is shown in FIG. 4 incorporated into an electric motor 22 with a shaft 24 having a worm 26 associated with a gear 28. The illustrated embodiment shows a bi-directional window-lift motor for a vehicle, but the bushing structure 10 can be used in any motor assembly having an armature and winding assembly. The gearhousing 30 of the motor 22 includes a generally elliptical recess 32 therein that extends along an axis C of the shaft 24. The recess 32 receives at least a part of the endplay member 20 of the bushing structure 10 in preferably an interference-fit arrangement. The protrusions 18 of the bushing member 12 fit into a portion of the gearhousing 30 to help maintain the bushing structure 10 in place with respect to the gearhousing 30. Upstanding ribs 33 (FIG. 5) can be provided to extend from the bottom of the recess 32. The ribs can define an X-shape. When the endplay member 20 is forced into the recess 32, the ribs 33 deform to define a dead stop for movement of the endplay member 20.

The end of the shaft 24 is received in the recess 14 of the bushing member 12 such that the bushing member 12 locates the shaft and prevents lock up of the motor. The assembly force from the shaft 24 will force the endplay member 20 into the proper location for automatic adjustment of the end gap between the shaft 24 and gearhousing 30. Thus, the single component of the bushing structure 10 functions to locate the shaft 24 and controls endplay of the shaft instead of the many components needed for these functions in the conventional bushing-endplate configuration as described above. Thus, the invention provides cost-savings, reduction of parts, and ease of assembly.

Figure 6:
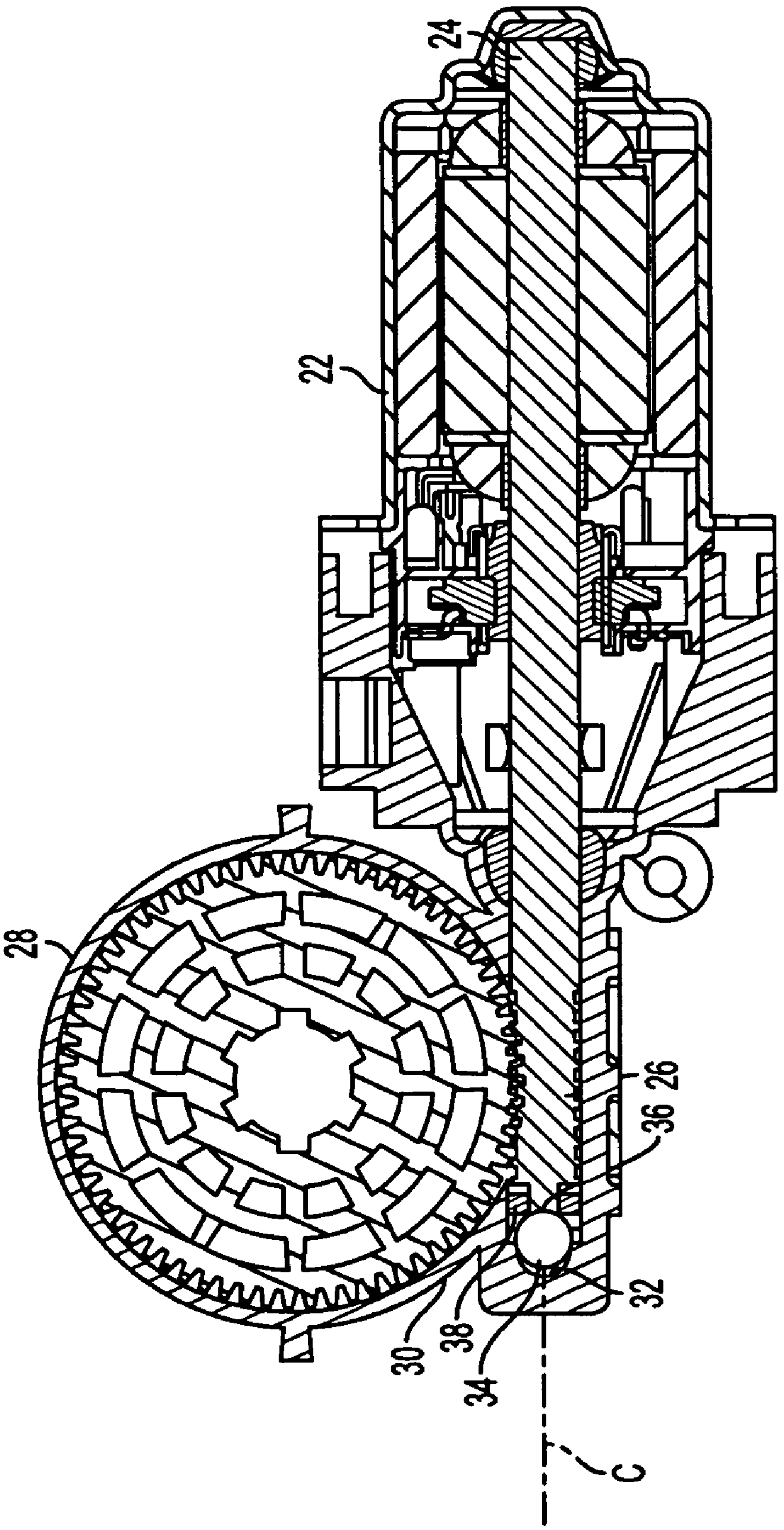
FIG. 6 is a sectional view of a motor incorporating a second embodiment of the bushing structure of the invention.

FIG. 6 shows a motor incorporating a second embodiment of the invention. As shown, instead of providing a single bushing structure 10 as in FIG. 4, an endplay member 34 in the form of a sphere is provided which is disposed within at least a portion of the generally elliptical recess 32 in the gearhousing 30. The end 36 of the shaft 24 contacts the sphere 34 and the assembly force of the shaft will force the sphere 34 into the proper position for automatic adjustment of the end gap. In addition, a cylindrical bushing member 38 is provided about end 36 of the shaft to self align the shaft 24 to prevent lock-up of the motor.

Thus, the embodiments of the invention reduce the number of parts for controlling shaft location and endplay of a bi-directional motor.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A bushing structure constructed and arranged to be operatively associated with a shaft of an electric motor, the motor having a housing including a generally elliptical recess therein defined along an axis of the shaft, the bushing structure comprising:

a generally cylindrical bushing member constructed and arranged to engage an end of the shaft so as to locate the shaft with respect to the housing and to prevent lockup of the motor, and an endplay member associated with the end of the shaft, the endplay member including a spherical portion constructed and arranged to be received in the elliptical recess so as to control endplay of the shaft, wherein the endplay member is integral with the bushing member and the spherical portion is a generally half-sphere extending from the bushing member.

2. The structure of claim 1, wherein the bushing member has a central axis and includes a recess therein extending along the central axis, the recess being constructed and arranged to receive the end of the shaft.

3. The structure of claim 2, wherein the recess includes a curved portion that is constructed and arranged to engage the end of the shaft.

4. The structure of claim 1, wherein the bushing member also includes a plurality of protrusions extending outwardly from a periphery thereof, the protrusions being constructed and arranged to engage the housing of the motor.

5. A bushing structure constructed and arranged to be operatively associated with a shaft of an electric motor, the motor having a housing including a generally elliptical recess therein defined along an axis of the shaft, the bushing structure comprising:

a generally cylindrical bushing member constructed and arranged to engage an end of the shaft so as to locate the shaft with respect to the housing and to prevent lockup of the motor, and an endplay member associated with the end of the shaft, the endplay member including a spherical portion constructed and arranged to be received in the elliptical recess so as to control endplay of the shaft, wherein upstanding ribs extend from a bottom of the elliptical recess so as to define a deformable stop.

6. A bushing structure constructed and arranged to be operatively associated with a shaft of an electric motor, the motor having a housing including a generally elliptical recess therein defined along an axis of the shaft, the bushing structure comprising:

means for receiving an end of the shaft so as to locate the shaft with respect to the housing and to prevent lockup of the motor, and means, associated with the end of the shaft, for engaging the elliptical recess so as to control endplay of the shafts, wherein upstanding ribs extend from a bottom of the elliptical recess so as to define a deformable stop.

7. The structure of claim 6, wherein the means for engaging is integral with the means for receiving and the means for receiving includes a spherical portion constructed and arranged to engage the recess.

8. The structure of claim 7, wherein the means for receiving has a central axis and includes a recess therein extending along the central axis, the recess being constructed and arranged to receive the end of the shaft.

9. The structure of claim 8, wherein the recess includes a curved portion that is constructed and arranged to engage the end of the shaft.

10. The structure of claim 6, wherein the means for receiving is a generally cylindrical bushing member including a plurality of protrusions extending outwardly from a periphery thereof, the protrusions being constructed and arranged to engage the housing of the motor.

11. The structure of claim 6, wherein the means for receiving is in a sphere separate from the bushing member.

12. A electric motor comprising:

a housing, a shaft mounted for rotation with respect to the housing, the housing including a generally elliptical recess therein, the recess being disposed generally adjacent to an end of the shaft, a generally cylindrical bushing member engaged with an end of the shaft so as to locate the shaft with respect to the housing and to prevent lockup of the motor, and an endplay member associated with the end of the shaft, the endplay member including a spherical portion received in the elliptical recess so as to control endplay of the shaft, wherein the endplay member is integral with the bushing member and the spherical portion is a generally half-sphere extending from the bushing member.

13. The motor of claim 12, wherein the bushing member has a central axis and includes a recess therein extending along the central axis, the recess receiving the end of the shaft.

14. The motor of claim 12, wherein the bushing member also includes a plurality of protrusions extending outwardly from a periphery thereof, the protrusions engaging the housing of the motor.

15. The motor of claim 12, wherein the motor is a bi-directional windowlift motor for a vehicle.

* * * * *